US006867528B2

(12) United States Patent
Inoue et al.

(10) Patent No.: US 6,867,528 B2
(45) Date of Patent: Mar. 15, 2005

(54) DYNAMOELECTRIC MACHINE AND METHOD FOR MOUNTING A BRUSH ASSEMBLY TO A BRUSH HOLDER

(75) Inventors: Hirokazu Inoue, Tokyo (JP); Hidehiko Kitahara, Tokyo (JP); Hideyuki Hayashi, Tokyo (JP); Tomoki Takahashi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/459,509

(22) Filed: Jun. 12, 2003

(65) Prior Publication Data

US 2003/0230952 A1 Dec. 18, 2003

(30) Foreign Application Priority Data

Jun. 12, 2002 (JP) ....................................... 2002-171310

(51) Int. Cl.$^7$ ......................... H01R 39/40; H02K 19/00

(52) U.S. Cl. ........................ 310/239; 310/245; 310/247

(58) Field of Search ................................ 310/247, 232, 310/233, 239, 245, 246, 248, 249

(56) References Cited

U.S. PATENT DOCUMENTS

| | | | | |
|---|---|---|---|---|
| 4,590,398 A | * | 5/1986 | Nagamatsu | 310/239 |
| 4,855,631 A | * | 8/1989 | Sato et al. | 310/239 |

FOREIGN PATENT DOCUMENTS

| | | | | |
|---|---|---|---|---|
| DE | 4129442 | * 4/1992 | H01R/39/40 |
| GB | 2096837 | * 10/1982 | H01R/39/40 |
| JP | 51-066409 | 6/1976 | |
| JP | 51-087205 | 7/1976 | |

* cited by examiner

*Primary Examiner*—Burton Mullins
(74) *Attorney, Agent, or Firm*—Sughrue Mion, PLLC

(57) ABSTRACT

A brush assembly is constructed such that a brush and a brush terminal are linked by means of a pigtail, a brush spring is disposed under compression between the brush and the brush terminal, and a cylindrical guide is disposed near the brush terminal inside the brush spring.

9 Claims, 14 Drawing Sheets

FIG. 23A
FIG. 23B
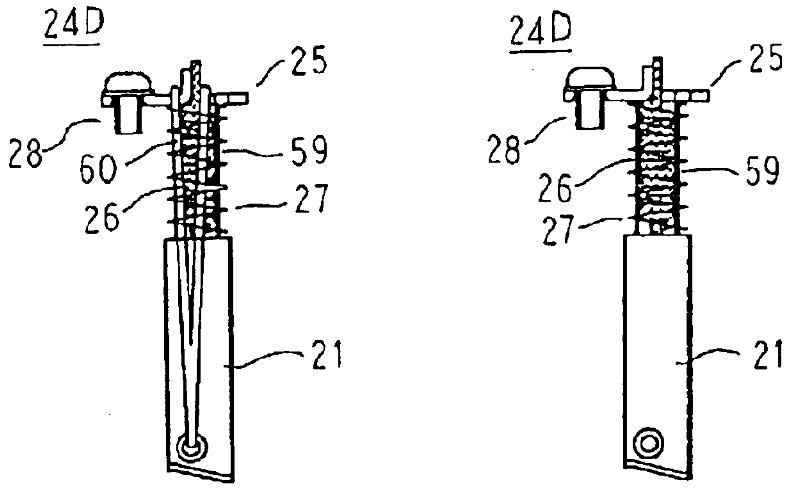
FIG. 24
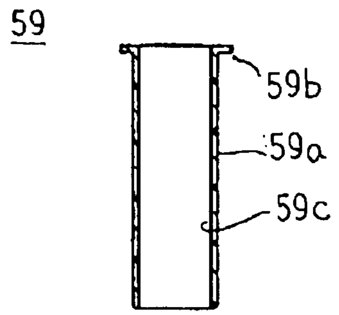

DYNAMOELECTRIC MACHINE AND METHOD FOR MOUNTING A BRUSH ASSEMBLY TO A BRUSH HOLDER

BACKGROUND OF THE INVENTION

1. Field of the Invention

The present invention relates to a dynamoelectric machine such as an automotive alternator, for example, and particularly to a brush assembly construction for a dynamoelectric machine and a method for mounting a brush assembly to a brush holder enabling improved mounting of the brush assembly.

2. Description of the Related Art

Generally, a brush holding apparatus in a dynamoelectric machine such as an automotive alternator, for example, is mounted internally in a tightly-closed case, making it is necessary to dismantle the case during brush replacement, thereby making workability extremely poor.

Thus, an automotive alternator in which an opening is disposed in a portion of the case facing the brush holding apparatus, enabling the brushes to be changed through the opening, has been proposed in Japanese Patent Laid-Open No. SHO 51-66409 (Gazette), etc., for example.

FIGS. 27 and 28 are a partial longitudinal section and a plan, respectively, showing a vicinity of the brush holding apparatus of the conventional automotive alternator described in Japanese Patent Laid-Open No. SHO 51-66409, for example, and FIG. 29 is a perspective showing a brush assembly used in the brush holding apparatus shown in FIGS. 27 and 28.

In FIGS. 27 to 29, a rotor 81 is fixed to a shaft 82 rotatably supported in a front bracket (not shown) and a rear bracket 84*a* by means of bearings 83, being disposed inside a case 84 composed of the front bracket and the rear bracket 84*a*. Slip rings 85 are mounted to a rear-end end portion of the shaft 82.

A stator 86 is constituted by: a cylindrical stator core 87; and a stator winding 88 installed in the stator core 87, first and second end portions of the stator core 87 being held between the front bracket and the rear bracket 84*a*, the stator 86 being disposed so as to surround the rotor 81.

A brush holding apparatus 89 is constituted by: a brush body portion 90 through which a pair of brush-housing angular apertures 90*a* are disposed; and a pair of brush assemblies 95 in each of which a brush 91, a pigtail 92, a brush spring 93, and a brush terminal 94 are assembled integrally. This brush holding apparatus 89 is mounted to the rear bracket 84*a* by securely fastening the brush body portion 90 to an inner wall surface of an end portion of the rear bracket 84*a* by means of a bracket screw 96, inserting the brushes 91 of each of the brush assemblies 95 into the brush-housing angular apertures 90*a*, and securely fastening the brush terminals 94 to the brush body portion 90 by means of terminal screws 97. Thus, the brushes 91 are forced into contact with the slip rings 85 by the brush springs 93.

In addition, an opening 98 for brush replacement is disposed through a portion of a side wall of the rear bracket 84*a* facing the brush body portion 90. A cover 99 is securely fastened to an outer circumferential surface of the side wall of the rear bracket 84*a* by means of cover screws 100 so as to cover the opening 98.

A brush replacement operation for the conventional automotive alternator constructed in this manner will now be explained.

First, the cover 99 is removed by removing the cover screws 100. Then, the terminal screws 97 are removed and the brush assemblies 95 are pulled out through the opening 98. Next, the brushes 91 of new brush assemblies 95 are inserted into the brush-housing angular apertures 90*a*, and the brush terminals 94 are pressed toward the slip rings 85 until the brush terminals 94 are placed in contact with mounting terminals 90*b* on the brush body portion 90. At this time, the brush springs 93 are compressed, and the pigtails 92 are housed inside the brush springs 93 in a flexed state and become entangled. Then, the brush terminals 94 are securely fastened to the mounting terminals 90*b* of the brush body portion 90 by means of the terminal screws 97 while pressing the brush springs 93. In addition, the cover 99 is placed over the opening 98 and securely fastened to the rear bracket 84*a* by means of the cover screws 100, completing replacement of the brushes 91.

In the conventional automotive alternator, the brush assemblies 95 are each assembled by passing a pigtail 92 having a first end joined to a brush 91 through a brush spring 93 formed into a coil shape and joining a second end of the pigtail 92 to a brush terminal 94 with the brush spring 93 in a compressed state. Thus, because the brush springs 93 are not restricted at all relative to a direction of bending, the flexed portions of the pigtails 92 may be pinched by the brush springs 93 or may apply bending stress to the brush springs 93 during the process of pressing the brush terminals 94 after inserting the brushes 91 into the brush-housing angular apertures 90*a*, giving rise to bending of the brush springs 93. In addition, because there are no members to guide the brush springs 93 as they are being compressed, if the balance of the pressure acting on the brush springs 93 becomes uneven, the brush springs 93 may become bent.

Consequently, because portions of the brush springs 93 projecting out of the brush-housing angular apertures 90*a* bend and flop over in the process of pressing the brush terminals 94, one problem has been that workability when mounting the brush assemblies 95 to the brush body portion 90 has been poor.

SUMMARY OF THE INVENTION

The present invention aims to solve the above problems and an object of the present invention is to provide a dynamoelectric machine enabling workability in mounting a brush assembly to a brush holder to be improved by disposing inside a brush spring a guide member for guiding compression of the brush spring and for internally housing a flexed portion of a pigtail arising during a process of compressing the brush spring to suppress flopping over of the brush spring during mounting of the brush assembly and pinching of the flexed portion of the pigtail in the brush spring.

Another object of the present invention is to provide a method for mounting a brush assembly to a brush holder enabling mounting workability to be improved by maintaining a brush spring in a compressed state having a predetermined length while inserting a brush into a brush insertion aperture of the brush holder to prevent flopping over of the brush spring during mounting of the brush assembly to the brush holder.

Yet another object of the present invention is to provide a method for mounting a brush assembly to a brush holder enabling mounting workability to be improved by using a guide member as a guide with a brush of the brush assembly inserted into a brush insertion aperture of the brush holder while compressing a brush spring to prevent flopping over of the brush spring during mounting of the brush assembly to the brush holder.

In order to achieve the above object, according to one aspect of the invention, there is provided a dynamoelectric machine including a case; a shaft, first and second ends of the shaft being rotatably supported in the case; a rotor fixed to the shaft and rotatably disposed inside the case; a slip ring fixed to the shaft; a stator fixed to the case so as to surround the rotor; a brush holder; a brush assembly mounted to the brush holder; an opening portion formed in a portion of the case facing the cover; and a cap for covering the opening portion. A brush insertion aperture is disposed through the brush holder, a holder terminal is disposed on an opening edge portion of the brush insertion aperture, and a cover is mounted to a head portion of the brush holder. The brush holder is disposed inside the case such that an aperture direction of the brush insertion aperture is perpendicular to an axial direction of the shaft. The brush assembly is constructed such that a brush and a brush terminal are linked by means of a pigtail, a brush spring is disposed under compression between the brush and the brush terminal, and a guide member for guiding expansion and compression of the brush spring is disposed inside the brush spring. The brush is housed inside the brush insertion aperture, the brush terminal being fixed to the holder terminal, and the brush is placed in contact with the slip ring by a force from the brush spring.

Therefore, provided is the dynamoelectric machine enabling workability in mounting the brush assembly to the brush holder to be improved by suppressing flopping over of the brush spring and pinching of a flexed portion of the pigtail in the brush spring during mounting of the brush assembly.

According to another aspect of the present invention, there is provided a method for mounting a brush assembly to a brush holder mounted to a dynamoelectric machine. The method includes the steps of placing said brush spring in a compressed state having a predetermined length by shortening a distance between said brush and said brush terminal; inserting said brush into a brush insertion aperture of said brush holder while maintaining said brush spring in said compressed state having a predetermined length; and fixing said brush terminal to a holder terminal of said brush holder then releasing said brush spring from said compressed state having a predetermined length.

Therefore, provided is the method for mounting a brush assembly to a brush holder enabling mounting workability to be improved by preventing flopping over of the brush spring during mounting of the brush assembly to the brush holder.

According to yet another aspect of the present invention, there is provided a method for mounting a brush assembly to a brush holder mounted to a dynamoelectric machine. The method includes the steps of inserting a guide member between said pigtail and said brush spring of said brush assembly with said pigtail disposed under tension; inserting said brush into a brush insertion aperture of said brush holder; and pressing said brush terminal using said guide member as a guide, placing said brush terminal in contact with a holder terminal of said brush holder, and then fixing said brush terminal to said holder terminal of said brush holder.

Therefore, provided is the method for mounting a brush assembly to a brush holder enabling mounting workability to be improved by preventing flopping over of the brush spring during mounting of the brush assembly to the brush holder.

BRIEF DESCRIPTION OF THE DRAWINGS

FIG. 23A is a diagram explaining a method for mounting a brush assembly in an automotive alternator according to Embodiment 6 of the present invention;

FIG. 23B is a diagram explaining the method for mounting the brush assembly in the automotive alternator according to Embodiment 6 of the present invention;

FIG. 24 is a cross section showing a guide used in the brush assembly in the automotive alternator according to Embodiment 6 of the present invention;

DETAILED DESCRIPTION OF THE PREFERRED EMBODIMENTS

Preferred embodiments of the present invention will now be explained with reference to the drawings.

Embodiment 1

Figure 1:
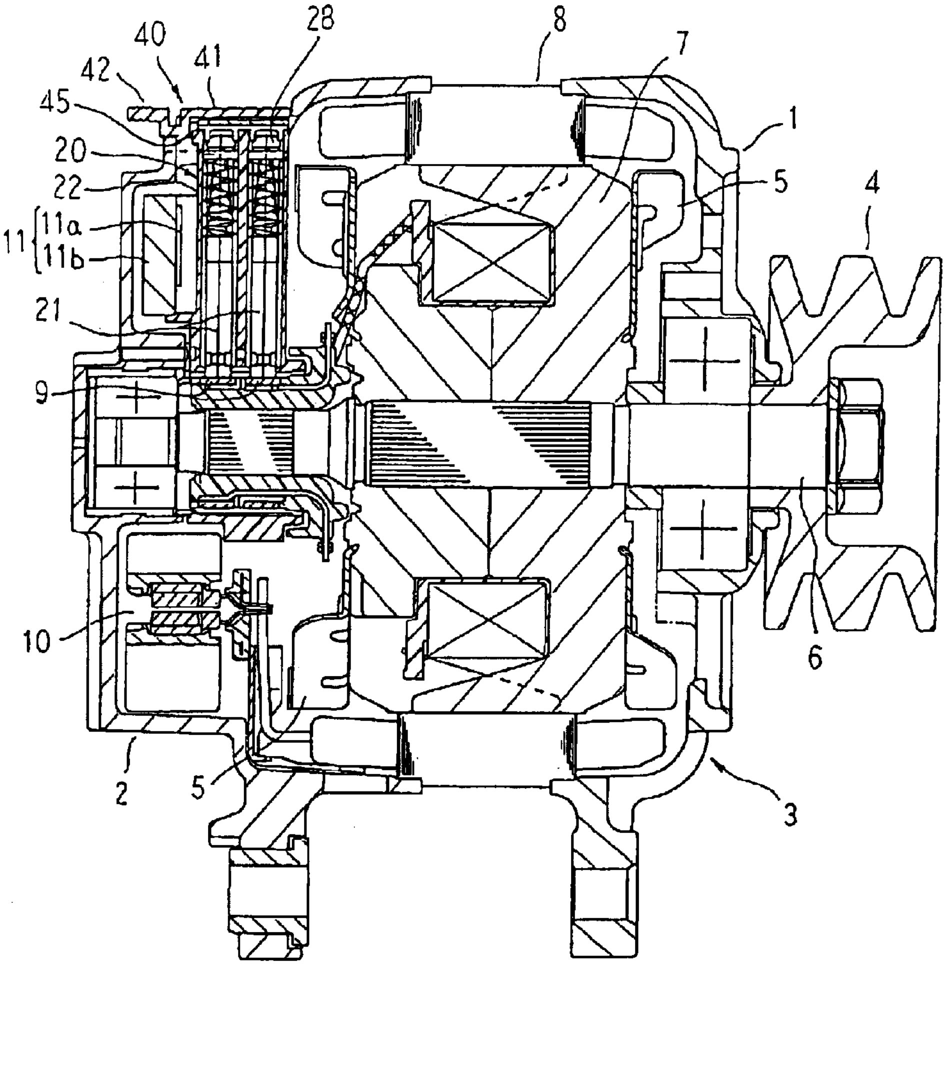
FIG. 1 is a longitudinal section showing an automotive alternator according to Embodiment 1 of the present invention.
Figure 2:
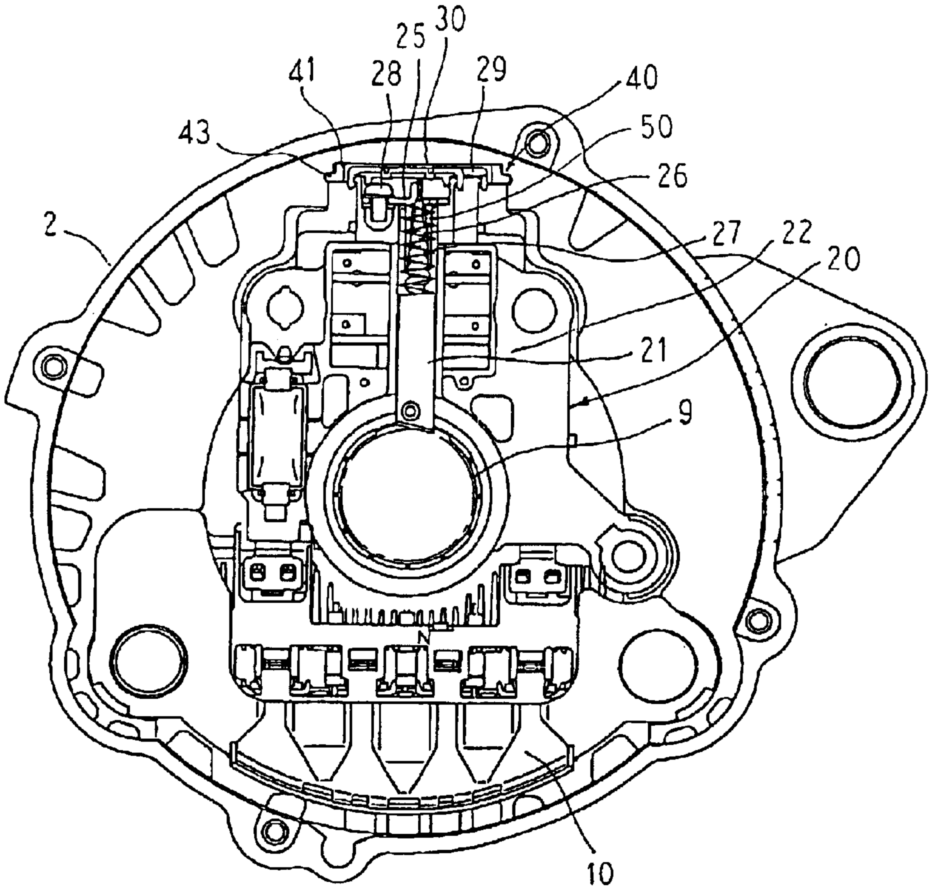
FIG. 2 is a partially cut away end elevation showing a rear bracket end of an interior portion of the automotive alternator according to Embodiment 1 of the present invention.
Figure 3:
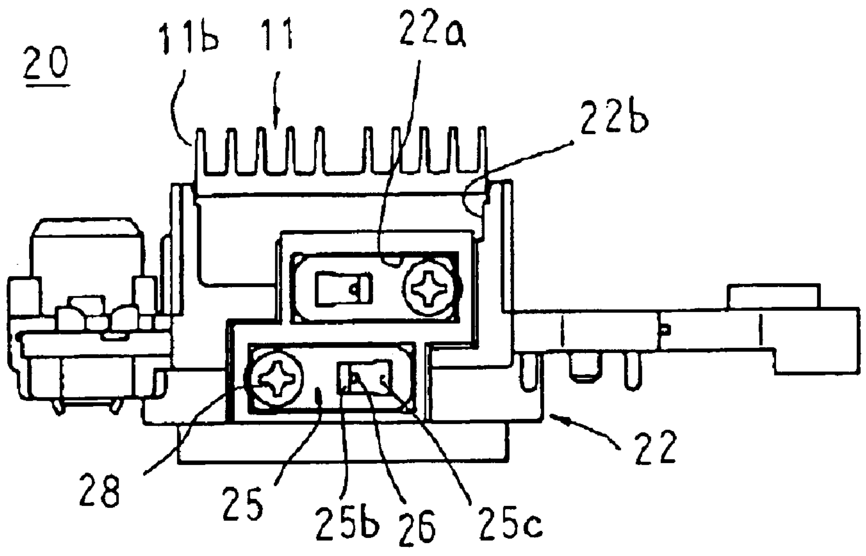
FIG. 3 is a plan showing a brush holding apparatus used in the automotive alternator according to Embodiment 1 of the present invention with a cover removed.
Figure 4:
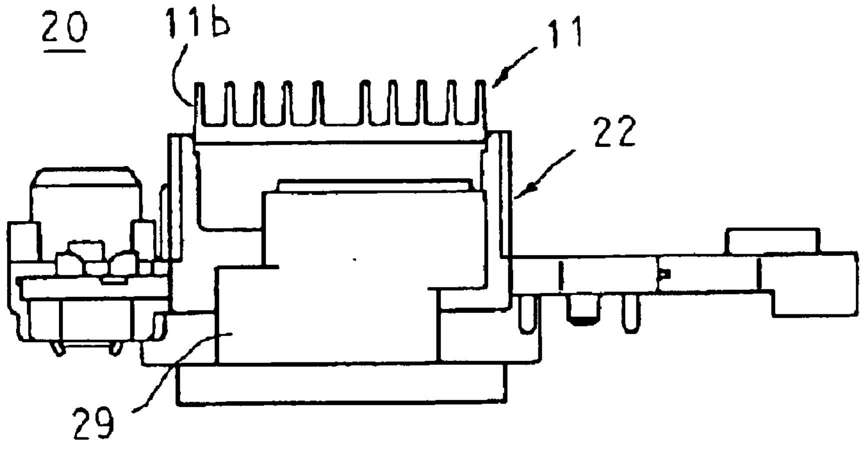
FIG. 4 is a plan showing the brush holding apparatus used in the automotive alternator according to Embodiment 1 of the present invention.
Figure 5:
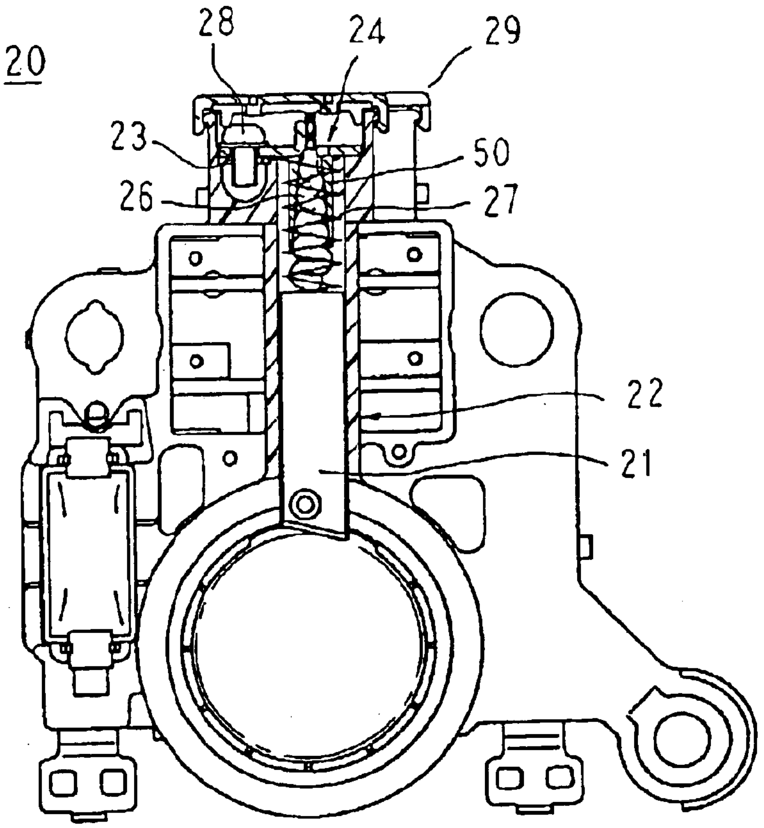
FIG. 5 is a partially cut away front elevation showing the brush holding apparatus used in the automotive alternator according to Embodiment 1 of the present invention.
Figure 6:
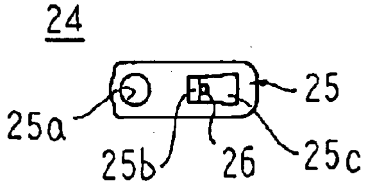
FIG. 6 is a front elevation showing a brush assembly of the brush holding apparatus used in the automotive alternator according to Embodiment 1 of the present invention.
Figure 7:
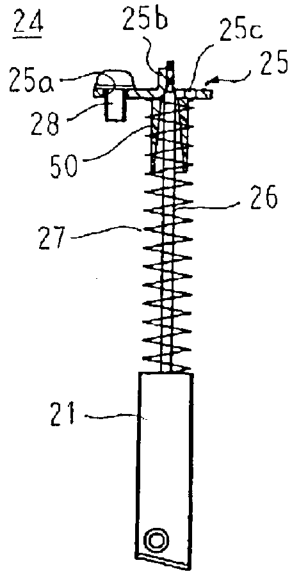
FIG. 7 is a partially cut away side elevation showing the brush assembly of the brush holding apparatus used in the automotive alternator according to Embodiment 1 of the present invention before insertion.
Figure 8:
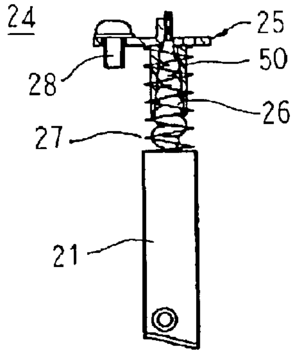
FIG. 8 is a partially cut away side elevation showing the brush assembly of the brush holding apparatus used in the automotive alternator according to Embodiment 1 of the present invention after insertion.
Figure 9:
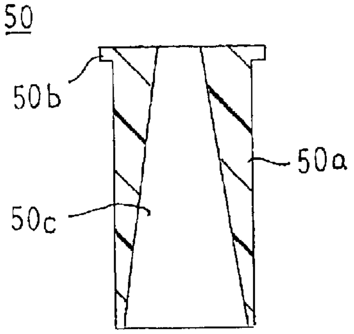
FIG. 9 is a cross section showing a guide mounted to the brush assembly used in the automotive alternator according to Embodiment 1 of the present invention.
Figure 10:
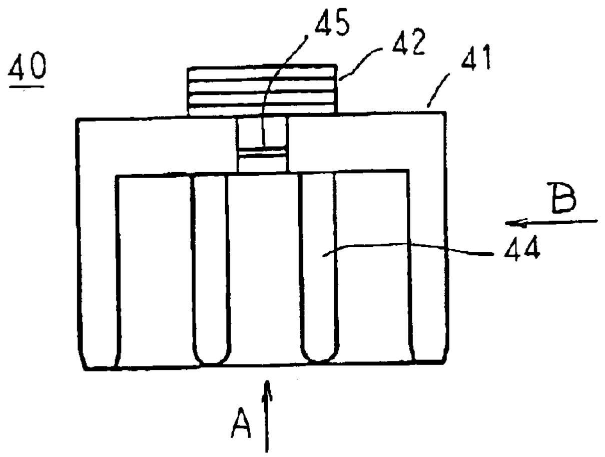
FIG. 10 is a plan showing a cap used in the automotive alternator according to Embodiment 1 of the present invention.
Figure 11:
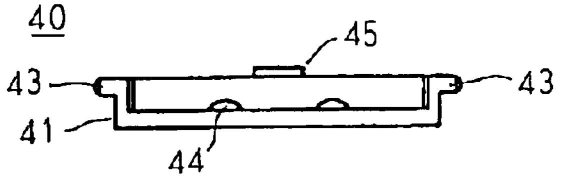
FIG. 11 is a side elevation of the cap shown in FIG. 10 viewed from direction A.
Figure 12:
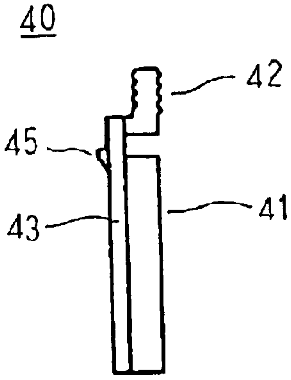
FIG. 12 is a side elevation of the cap shown in FIG. 10 viewed from direction B.
Figure 13:
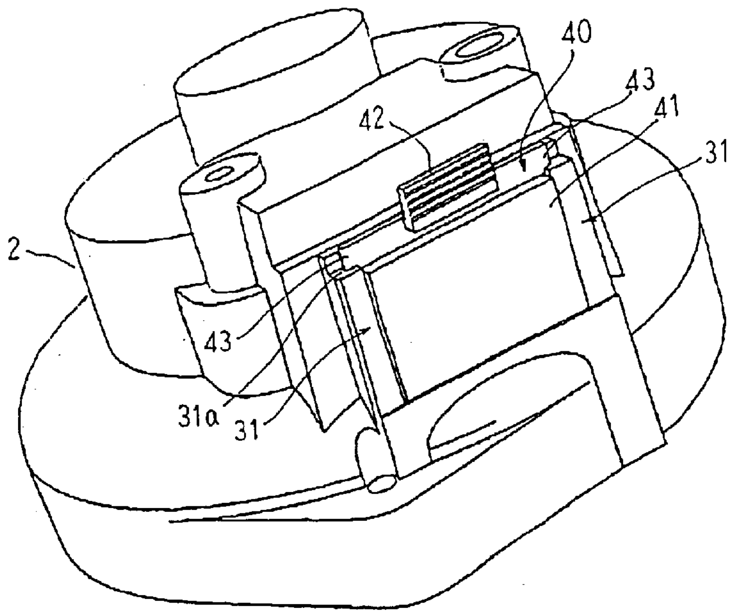
FIG. 13 is a perspective showing the rear bracket of the automotive alternator according to Embodiment 1 of the present invention with the cap mounted.
Figure 14:
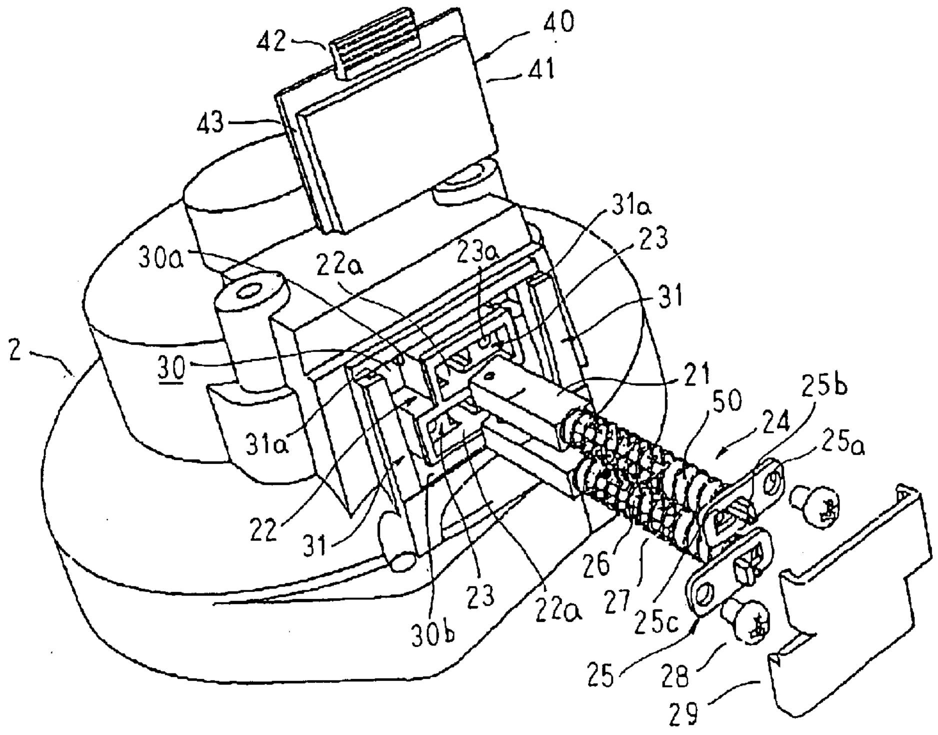
FIG. 14 is a perspective showing the rear bracket of the automotive alternator according to Embodiment 1 of the present invention with the cap removed.

FIG. 1 is a longitudinal section showing an automotive alternator according to Embodiment 1 of the present invention, FIG. 2 is a partially cut away end elevation showing a rear bracket end of an interior portion of the automotive alternator according to Embodiment 1 of the present invention, FIG. 3 is a plan showing a brush holding apparatus used in the automotive alternator according to Embodiment 1 of the present invention with a cover removed, FIG. 4 is a plan showing the brush holding apparatus used in the automotive alternator according to Embodiment 1 of the present invention, FIG. 5 is a partially cut away front elevation showing the brush holding apparatus used in the automotive alternator according to Embodiment 1 of the present invention, FIG. 6 is a front elevation showing a brush assembly of the brush holding apparatus used in the automotive alternator according to Embodiment 1 of the present invention, FIG. 7 is a partially cut away side elevation showing the brush assembly of the brush holding apparatus used in the automotive alternator according to Embodiment 1 of the present invention before insertion, FIG. 8 is a partially cut away side elevation showing the brush assembly of the brush holding apparatus used in the automotive alternator according to Embodiment 1 of the present invention after insertion, FIG. 9 is a cross section showing a guide mounted to the brush assembly used in the automotive alternator according to Embodiment 1 of the present invention, FIG. 10 is a plan showing a cap used in the automotive alternator according to Embodiment 1 of the present invention, FIG. 11 is a side elevation of the cap shown in FIG. 10 viewed from direction A, FIG. 12 is a side elevation of the cap shown in FIG. 10 viewed from direction B, FIG. 13 is a perspective showing the rear bracket of the automotive alternator according to Embodiment 1 of the present invention with the cap mounted, and FIG. 14 is a perspective showing the rear bracket of the automotive alternator according to Embodiment 1 of the present invention with the cap removed.

In the figures, an automotive alternator includes: a case 3 constituted by a front bracket 1 and a rear bracket 2 made of aluminum, each being prepared into a general cup shape; a shaft 6 rotatably disposed inside the case 3, a pulley 4 being fixed to a first end portion of the shaft 6; a Lundell-type rotor 7 fixed to the shaft 6; a stator 8 mounted to the case 3, the stator 8 being held between the front and rear brackets 1 and 2 so as to surround the rotor 7; fans 5 respectively fixed to first and second end portions of the rotor 7; a pair of slip rings 9 fixed to a second end portion of the shaft 6 so as to be disposed side by side in an axial direction of the shaft 6 for supplying electric current to the rotor 7; a brush holding apparatus 20 in which a pair of brushes 21 sliding on a surface of each of the slip rings 9 are housed inside a brush holder 22; a rectifier 10 electrically connected to the stator 8 for converting alternating current generated in the stator 8 into direct current; and a regulator 11 fitted onto the brush holder 22, the regulator 11 adjusting the magnitude of the alternating voltage generated in the stator 8.

The brush holder 22 is made of a resin such as a polyphenylene sulfide (PPS), etc. A pair of angular brush insertion apertures 22*a* are disposed side by side so as to pass through the brush holder 22, and holder terminals 23 electrically connected to a battery (not shown) constituting an electric power supply are formed integrally on the brush holder 22 so as to be exposed on opening edge portions of each of the brush insertion apertures 22*a*. Holder-terminal threaded apertures 23*a* whose aperture directions align with an aperture direction of the brush insertion apertures 22*a* are disposed on each of the holder terminals 23.

A brush assembly 24 is constructed such that first and second ends of a pigtail 26 are joined to a brush 21 and a brush terminal 25, a brush spring 27 formed into a coil shape being disposed under compression between the brush 21 and the brush terminal 25 so as to envelop the pigtail 26, and a guide 50 functioning as a guide member being disposed inside the brush spring 27 at an end near the brush terminal 25. The brush terminal 25 is a metal plate having a shape covering a brush insertion aperture 22*a* and a holder terminal 23, a fixing aperture 25*a* being disposed through a position corresponding to the corresponding holder-terminal threaded aperture 23*a*, and a cut-and-raised segment 25*b* functioning as a joining segment formed by cutting and raising a portion of the metal plate being formed at a position corresponding to an aperture center of the corresponding brush insertion aperture 22*a*. A cut aperture 25*c* is formed by cutting and raising the cut-and-raised segment 25*b*. The first end of the pigtail 26 is joined to the cut-and-raised segment 25*b*. The guide 50 is prepared using a nylon (trademark of E. I. du Pont de Nemours and Company), and is constituted by: a cylindrical portion 50*a*; and an annular flange portion 50*b* disposed so as to extend from an outer periphery of a first end of the cylindrical portion 50*a*. This cylindrical portion 50*a* is formed such that the wall thickness thereof increases gradually from a second end toward the first end. In other words, a penetrating aperture 50*c* is constructed into a shape opening outward toward the second end at a position of a central axis of the cylindrical portion 50*a*. The flange portion 50*b* is mounted so as to be held between the brush spring 27 and the brush terminal 25, being elastically supported by the force of the brush spring 27.

The brush holding apparatus 20 is constructed by mounting two brush assemblies 24 to the brush holder 22 by inserting the brushes 21 inside the brush insertion apertures 22*a*, aligning the cut apertures 25*a* of the brush terminals 25 with the threaded apertures 23*a* of the holder terminals 23, and securely fastening terminal screws 28 to the holder-terminal threaded apertures 23*a*, the terminal screws 28 being passed through the cut apertures 25*a* from longitudinally outside the brushes 21 Then, a cover 29 provided with a packing (not shown) on an inner wall surface is fitted into a head portion of the brush holder 22 from longitudinally outside the brushes 21, shielding the fastening portion between the holder terminals 23 and the brush terminals 25 and the brush insertion apertures 22*a* from the outside, thereby ensuring that the brush holding apparatus 20 is waterproof. Moreover, the terminal screws 28 are magnetized.

The brush holding apparatus 20 is mounted to the rear bracket 2 such that the pair of brushes 21 line up in an axial direction of the shaft 6 and the longitudinal direction of the brushes 21 is perpendicular to the axial direction of the shaft 6. Thus, the brushes 21 are pushed against each of the slip rings 9 by the force of the respective brush springs 27 and slide on the slip rings 9 due to the rotation of the shaft 6. Furthermore, the brush holder 22 extends in a radial direction to a vicinity of an inner wall surface of a side portion of the rear bracket 2. An opening portion 30 for brush replacement is formed in a rectangular shape in a portion of the side portion of the rear bracket 2 facing the cover 29 of the brush holding apparatus 20 longitudinally outside (radially outside) the brushes 21.

The rectifier 10 is mounted to the rear bracket 2 in a plane perpendicular to the axial direction of the shaft 6 so as to overlap the brush holding apparatus 20 in a circumferential direction. The regulator 11 is constructed by fixing a circuit board 11*a* mounted with electronic components to a heat sink 11*b*. The regulator 11 is mounted by fitting the heat sink 11*b* onto the brush holder 22 such that the circuit board 11*a* is housed inside a circuit housing portion 22*b* of the brush holder 22. Thus, the heat sink 11*b* of the regulator 11 faces an inner wall surface of an end portion of the rear bracket 2.

In the opening portion 30 of the rear bracket 2, a pair of side walls 31 are formed facing each other parallel to the axial direction of the shaft 6. Grooves 31*a* parallel to the axial direction of the shaft 6 are formed in the facing inner wall surfaces of the pair of side walls 31. Moreover, an upper surface of a front-end wall of the opening portion 30 is positioned in a common plane with lower surfaces of the grooves 31*a* of the side walls 31, and an upper surface of a rear-end wall, which is positioned near the front bracket 1, is positioned in a substantially common plane with upper surfaces of the side walls 31.

The cap 40 is made of a polybutylene terephthalate (PBT) resin, and is constituted by: a main body portion 41 formed into a general box shape; a handle 42 disposed so as to extend from a first end of the main body portion 41; flange portions 43 disposed so as to extend from first and second side portions, respectively, of the main body portion 41; protruding portions 44 disposed so as to protrude from an inner wall surface of the main body portion 41; and an engaging portion 45 for preventing dislodgment disposed so as to protrude from a first end of the inner wall surface of the main body portion 41. This cap 40 is mounted to the opening, portion 30 by holding the handle 42, inserting the flange portions 43 into the grooves 31*a*, sliding the cap 40 until a second end portion of the main body portion 41 comes into contact with a rear-end surface 30*b* of the opening portion 30, and then elastically engaging the engaging portion 45 in the front-end surface 30*a* of the opening portion 30. Thus, the opening portion 30 is covered by the cap 40. The protruding portions 44 press an upper surface of the cover 29 radially inward, compressing the packing on the cover 29.

Next, a brush replacement operation for the automotive alternator constructed in this manner will be explained.

During replacement of the brushes 21, first the elastic engagement between the engaging portion 45 and the front-end surface 30*a* of the opening portion 30 is released by holding the handle 42 and pulling upward in a radial direction (upward in FIG. 1), then the cap 40 is pulled out by sliding it toward a front end of the opening portion 30. Next, after removing the cover 29, the terminal screws 28 are loosened and removed by inserting a screw driver through the opening portion 30, and the brush assemblies 24 are pulled out of the brush insertion apertures 22*a*.

Then, the brushes 21 of new brush assemblies 24 are inserted into the brush insertion apertures 22*a*. In this state, the pigtails 26, as shown in FIG. 7, are disposed under tension between the brushes 21 and the holder terminals 25 by the force of the brush springs 27.

Next, the brush terminals 25 are placed in contact with the holder terminals 23 by pressing the brush terminals 25 radially inward. At this time, the brush springs 27 are guided by outer circumferential surfaces of the cylindrical portions 50*a* of the guides 50 while being compressed. Furthermore, the pigtails 26 flex with the compression of the brush springs 27, the flexed portions thereof being housed inside the penetrating apertures 50*c* of the guides 50 as shown in FIG. 8.

Then, the brush terminals 25 are fastened to the holder terminals 23 by fastening the terminal screws 28 to the holder-terminal threaded apertures 23*a*, the terminal screws 28 being passed through the cut apertures 25*a* using a screw driver from longitudinally (radially) outside the brushes 21, and the cover 29 is fitted into the head portion of the brush holder 22. Next, the replacement of the brushes 21 is completed by inserting the cap 40 into the opening portion 30 in a similar manner.

Figure 15:
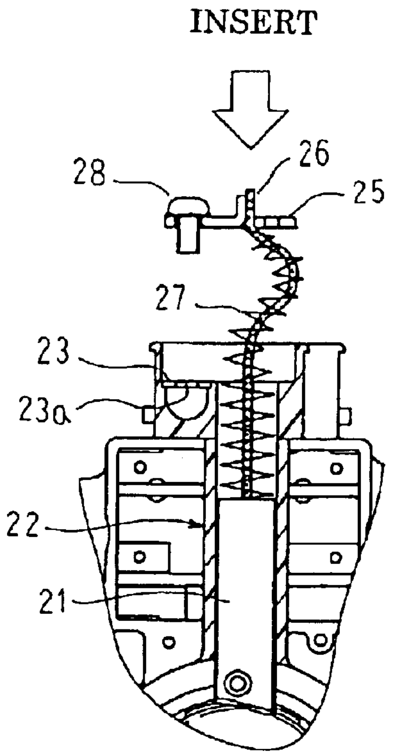
FIG. 15 is a diagram explaining a flopped-over state of the brush spring during mounting of the brush assembly.

Mounting of a brush assembly when a guide 50 is not mounted will now be explained. Specifically, the brush assembly is constructed such that first and second ends of a pigtail 26 are joined to a brush 21 and a brush terminal 25, a brush spring 27 formed into a coil shape being disposed under compression between the brush 21 and the brush terminal 25 so as to envelop the pigtail 26. Thus, if the balance of pressure on the brush terminal 25 becomes uneven, as shown in FIG. 15, bending of the brush spring 27, in other words, flopping over of the brush spring 27 occurs. As a result, mountability of the brush assembly is poor. In addition, there is a danger that the pigtail 26 may flex with the compression of the brush spring 27 and be pinched in the brush spring 27. When the pigtail 26 is pinched in the brush spring 27, breakage of the pigtail 26 or flopping over of the brush spring 27 may occur.

In the brush assembly 24 according to Embodiment 1, a guide 50 is disposed near the brush terminal 25 inside the brush spring 27. Thus, in the process of pressing the brush terminal 25 toward the brush 21, because the brush spring 27 is guided by the outer circumferential surface of the cylindrical portion 50*a* of the guide 50 while being compressed, the brush spring 27 is prevented from flopping over even if there is an imbalance in the pressure on the brush terminal 25. And when the pigtail 26 flexes with the compression of the brush springs 27, because the flexed portion thereof is housed inside the penetrating aperture 50*c* (the cylindrical portion 50*a*) of the guide 50, pinching of the pigtail 26 in the brush spring 27 is suppressed.

Consequently, the mountability of the brush terminal 25 into the brush holder 22 is improved and the occurrence of breakage of the pigtail 26 can be prevented.

In addition, because the penetrating aperture 50*c* is disposed through at the position of the central axis of the cylindrical portion 50*a* of the guide 50 such that the inside diameter increases gradually toward the brush 21 (decreases gradually toward the brush terminal 25), the flexed portion of the pigtail 26 is conveyed into and housed inside the penetrating aperture 50*c* smoothly. As a result, the danger that the pigtail 26 will be pinched in the brush spring 27 during the process of compressing the brush spring 27 is significantly reduced.

Because the terminal screw 28 are magnetized, the terminal screws 28 are magnetically attracted to the screw driver during removal and replacement of the terminal screws 28, preventing the terminal screws 28 from dropping inside the case 3.

In Embodiment 1, the brush holding apparatus 20 is disposed such that the aperture directions of the brush insertion apertures 22*a* are aligned with a radial direction (a direction perpendicular to the axial direction of the shaft 6) and the openings of the brush insertion apertures 22*a* are in close proximity to the inner wall surface of the side portion of the rear bracket 2. The opening portion 30 of the rear bracket 2 is disposed in a portion of the side portion of the rear bracket 2 facing the brush insertion apertures 22*a*. Holder terminals 23 are formed integrally with the brush holder 22 so as to be exposed on opening edge portions of the brush insertion apertures 22*a* and threaded apertures 23*a* in which the aperture direction is a radial direction are formed in the holder terminals 23.

Thus, because the brush insertion apertures 22*a* and the opening portion 30 are superposed in a radial direction, and the direction of insertion and removal of the brush assemblies 24 to and from the brush insertion apertures 22*a* and the direction of removal and replacement of the terminal screws 28 are aligned with the radial direction, the operation of removing and replacing the brush assemblies 24 and the terminal screws 28 can be performed simply using the opening portion 30 without dismantling the case 3, enabling the operation of replacing the brushes 21 to be improved.

Because the brush holder 22 is disposed over the entire length of a radial dimension between the slip rings 9 and the opening portion 30 disposed in the rear bracket 2, the brushes 21 can be lengthened, enabling extension of the service life of the brushes 21, thereby enabling brush replacement frequency to be reduced.

Because the cap 40 is mounted slidably so as to be guided by the flange portions 43 in the grooves 31*a* of the side walls 31, removal and replacement of the cap 40 can be performed simply by pushing or pulling the cap 40 in one direction, improving the brush replacement operation.

When an automotive alternator is mounted to an automotive vehicle, there is clear space in the axial direction of the automotive alternator. Because the sliding direction of this cap 40 is aligned with the axial direction of the shaft 6, space for removal of the cap 40 is ensured, further improving the brush replacement operation.

Moreover, Embodiment 1 above has been explained for a case in which the flange portions 43 are slidably inserted into the grooves 31*a* and the cap 40 is secured to the opening portion 30 by elastically engaging the engaging portion 45 in the front-end surface 30*a* of the opening portion 30, but the method for inserting the cap 40 into the opening portion 30 is not limited to this. For example, the cap 40 may also be secured to the opening portion 30 by disposing protrusions on the flange portions 43, disposing recess portions in inner wall surfaces of the grooves 31*a*, and inserting the protrusions into the recess portions when mounting the cap 40 to the opening portion 30.

Embodiment 2

Figure 16A:
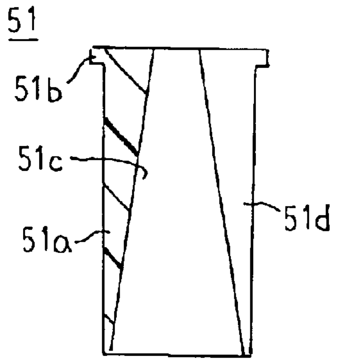
FIG. 16A is a cross section explaining a construction of a guide used in a brush assembly of an automotive alternator according to Embodiment 2 of the present invention.
Figure 16B:
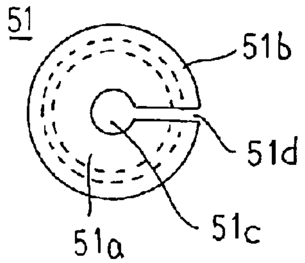
FIG. 16B is a front elevation explaining the construction of the guide used in the brush assembly of the automotive alternator according to Embodiment 2 of the present invention.

FIGS. 16A and 16B are diagrams explaining a construction of a guide used in a brush assembly of an automotive alternator according to Embodiment 2 of the present invention, FIG. 16A being a cross section and FIG. 16B being a front elevation.

In FIGS. 16A and 16B, a guide 51 functioning as a guide member is prepared using a nylon (trademark of E. I. du Pont de Nemours and Company), and is constituted by: a cylindrical portion 51*a*; and an annular flange portion 51*b* disposed so as to extend from an outer periphery of a first end of the cylindrical portion 51*a*. This cylindrical portion 51*a* is formed such that the wall thickness thereof increases gradually from a second end toward the first end. In other words, a penetrating aperture 51*c* is constructed into a shape opening outward toward the second end at a position of a central axis of the cylindrical portion 51*a*. In addition, the cylindrical portion 51*a* is constructed with a C-shaped cross section by forming a slit 51*d* in the peripheral wall of the cylindrical portion 51*a* so as to extend from a first axial end to a second axial end. The guide 51, in a similar manner to the guides 50 in Embodiment 1 above, is mounted by interposing the flange portion 51*b* between the brush spring 27 and the brush terminal 25 so as to be elastically supported by the force of the brush spring 27.

Moreover, Embodiment 2 is constructed in a similar manner to Embodiment 1 above except for the fact that the guides 51 are used instead of the guides 50.

In Embodiment 1 above, because there is no slit in the guides 50, the brush assembly 24 is assembled by joining the first end of the pigtail 26 to the brush 21, passing the second end of the pigtail 26 through the brush spring 27 and the penetrating aperture 50*b* of the guide 50, and joining the second end of the pigtail 26 to the brush terminal 25 while pressing the brush spring 27 and the guide 50 toward the brush 21. Thus, it is necessary to press two parts (the brush spring 27 and the guide 50) toward the brush 21 while joining the second end of the pigtail 26 to the brush terminal 25, making assembly of the brush assembly 24 somewhat difficult.

In Embodiment 2, because the slit 51*d* is formed in the peripheral wall of the cylindrical portion 51*a* of the guide 51 so as to extend from the first axial end to the second axial end, the brush assembly can be assembled as follows:

First, the brush 21, the pigtail 26, and the brush spring 27 are integrated by joining the first end of the pigtail 26 to the brush 21, passing the second end of the pigtail 26 through the brush spring 27, and joining the second end of the pigtail 26 to the brush terminal 25. Next, a portion of the pigtail 26 is exposed by compressing the brush spring 27, and the exposed portion of the pigtail 26 is inserted into the penetrating aperture 51*c* through the slit 51*d*. Then, when the brush spring 27 is allowed to return to its original state, the flange portion 51*b* of the guide 51 is held between the brush spring 27 and the brush terminal 25, and the guide 51 is disposed so as to be elastically supported near the brush terminal 25 inside the brush spring 27, completing assembly of the brush assembly.

Consequently, according to Embodiment 2, retrofitting of the guides 51 becomes possible. Thus, when the second end of the pigtails 26 is being joined to the brush terminal 25, it is only necessary to compress the brush spring 27 toward the brush 21, improving assembly of the brush assemblies.

Moreover, it goes without saying that the brush assembly in Embodiment 2 can also be assembled in a similar manner to Embodiment 1 above.

Embodiment 3

Figure 17A:
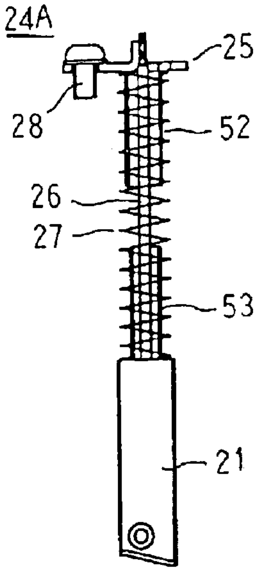
FIG. 17A is a diagram explaining a construction of a brush assembly in an automotive alternator according to Embodiment 3 of the present invention.
Figure 17B:
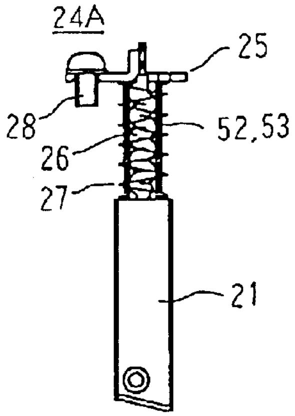
FIG. 17B is a diagram explaining the construction of the brush assembly in the automotive alternator according to Embodiment 3 of the present invention.
Figure 18:
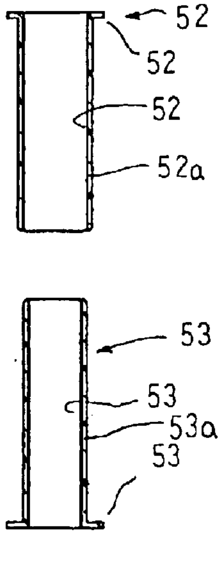
FIG. 18 is a cross section showing a guide used in the brush assembly in the automotive alternator according to Embodiment 3 of the present invention.

FIGS. 17A and 17B are diagrams explaining a construction of a brush assembly in an automotive alternator according to Embodiment 3 of the present invention, FIG. 17A showing a state before the brush assembly is mounted and FIG. 17B showing a mounted state of the brush assembly. FIG. 18 is a cross section showing a guide used in the brush assembly in the automotive alternator according to Embodiment 3 of the present invention.

In FIG. 18, a first guide 52 is prepared using a nylon (trademark of E. I. du Pont de Nemours and Company), and is constituted by: a first-guide cylindrical portion 52*a*; and an annular first-guide flange portion 52*b* disposed so as to extend from an outer periphery of a first end of the first-guide cylindrical portion 52*a*. This first-guide cylindrical portion 52*a* is formed with a uniform thickness, and a first-guide penetrating aperture 52*c* is constructed at a position of a central axis of the first-guide cylindrical portion 52*a* so as to have a uniform inside diameter. A second guide 53 is prepared using a nylon (trademark of E. I. du Pont de Nemours and Company), and is constituted by: a second-guide cylindrical portion 53*a*; and an annular second-guide flange portion 53*b* disposed so as to extend from an outer periphery of a first end of the second-guide cylindrical portion 53*a*. This second-guide cylindrical portion 53*a* is formed with a uniform thickness, and a second-guide penetrating aperture 53*c* is constructed at a position of a central axis of the second-guide cylindrical portion 53*a* so as to have a uniform inside diameter. The inside diameter of the first-guide penetrating aperture 52*b* is formed so as to be greater than the outside diameter of the second-guide cylindrical portion 53*a*. Moreover, a guide member is constituted by the first guide 52 and the second guide 53.

A brush assembly 24A, as shown in FIGS. 17A and 17B, is constructed such that first and second ends of a pigtail 26 are joined to a brush 21 and a brush terminal 25, a brush spring 27 formed into a coil shape being disposed under compression between the brush 21 and the brush terminal 25 so as to envelop the pigtail 26, the first guide 52 being disposed inside the brush spring 27 at an end near the brush terminal 25, and the second guide 53 being disposed inside the brush spring 27 at an end near the brush 21. The first guide 52 and the second guide 53 are elastically supported by the first-guide flange portion 52*b* being held between the brush spring 27 and the brush terminal 25 and the second-guide flange portion 53*b* being held between the brush spring 27 and brush 21.

Moreover, Embodiment 3 is constructed in a similar manner to Embodiment 1 above except for the fact that the first and second guides 52 and 53 are used instead of the single guide 50.

As shown in FIG. 17A, before the brush assembly 24A is mounted to the brush holder 22, the pigtail 26 is disposed under tension between the brush 21 and the brush terminal 25 by the force of the brush spring 27, and the first and second guides 52 and 53 are disposed near the brush terminal 25 and the brush 21 inside the brush spring 27 such that end portions at opposite ends from the flange portions face each other.

When the brush assembly 24A is being mounted to the brush holder 22, the brush 21 is inserted into the brush insertion aperture 22*a* of the brush holder 22, and the brush terminal 25 is pressed. Thus, the brush spring 27 is guided by the cylindrical portions 52*a* and 53*a* of the first guide 52 and the second guide 53 while being compressed. The first guide 52 approaches the brush 21 with this compression of the brush spring 27 and eventually the second guide 53 is housed inside the first-guide penetrating aperture 52*c*. The pigtail 26, as shown in FIG. 17B, flexes with the compression of the brush spring 27, the flexed portions thereof being housed inside the penetrating apertures 52*c* and 53*c* of the first and second guides 52 and 53.

Consequently, similar effects to those in Embodiment 1 above can also be achieved in Embodiment 3.

Furthermore, because first and second guides 52 and 53 having different diameters are disposed facing each other near the brush terminal 25 and the brush 21 inside the brush spring 27, the flexed portions of the pigtail 26 near the brush terminal 25 and near the brush 21 are prevented from being pinched in the brush spring 27, enabling breakage of the pigtail 26 and flopping over of the brush spring 27 to be prevented.

Embodiment 4

Figure 19A:
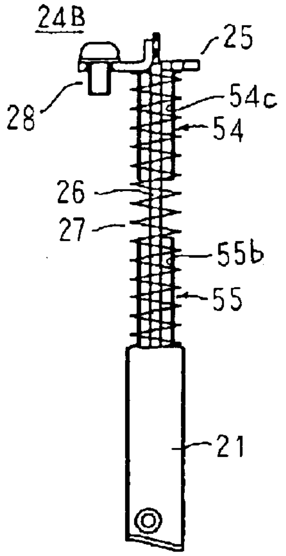
FIG. 19A is a diagram explaining a construction of a brush assembly in an automotive alternator according to Embodiment 4 of the present invention.
Figure 19B:
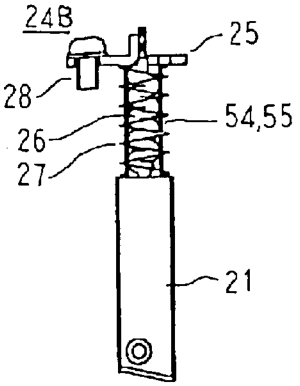
FIG. 19B is a diagram explaining the construction of the brush assembly in the automotive alternator according to Embodiment 4 of the present invention.
Figure 20:
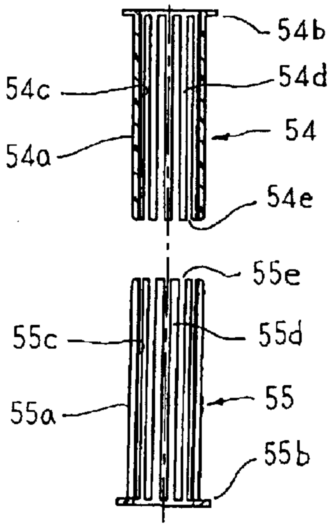
FIG. 20 is a cross section showing a guide used in the brush assembly in the automotive alternator according to Embodiment 4 of the present invention.

FIGS. 19A and 19B are diagrams explaining a construction of a brush assembly in an automotive alternator according to Embodiment 4 of the present invention, FIG. 19A showing a state before the brush assembly is mounted and FIG. 19B showing a mounted state of the brush assembly. FIG. 20 is a cross section showing a guide used in the brush assembly in the automotive alternator according to Embodiment 4 of the present invention.

In FIG. 20, a first guide 54 is prepared using a nylon (trademark of E. I. du Pont de Nemours and Company), and is constituted by: a first-guide cylindrical portion 54*a*; and an annular first-guide flange portion 54*b* disposed so as to extend from an outer periphery of a first end of the first-guide cylindrical portion 54*a*. This first-guide cylindrical portion 54*a* is formed with a uniform thickness, a first-guide penetrating aperture 54*c* being constructed at a position of a central axis of the first-guide cylindrical portion 54*a* so as to have a uniform inside diameter. In addition, first-guide slits 54*d* formed so as to extend from a root portion of the first-guide flange portion 54*b* to a second end of the first-guide cylindrical portion 54*a* are constructed so as to be formed at a predetermined pitch in a circumferential direction.

A second guide 55 is prepared using a nylon (trademark of E. I. du Pont de Nemours and Company), and is constituted by: a second-guide cylindrical portion 55*a*; and an annular second-guide flange portion 55*b* disposed so as to extend from an outer periphery of a first end of the second-guide cylindrical portion 55*a*. This second-guide cylindrical portion 55*a* is formed with a uniform thickness, a second-guide penetrating aperture 55*c* being constructed at a position of a central axis of the second-guide cylindrical portion 55*a* so as to have a uniform inside diameter. In addition, second-guide slits 55*d* formed so as to extend from a root portion of the second-guide flange portion 55*b* to a second end of the second-guide cylindrical portion 55*a* are constructed so as to be formed at a predetermined pitch in a circumferential direction.

The first guide 54 and the second guide 55 are formed into an identical shape. A width of the first-guide and second-guide slits 54*d* and 55*d* is formed so as to be larger than a width of first-guide and second-guide tongue pieces 54*e* and 55*e* defined by the first-guide and second-guide slits 54*d* and 55*d*. Moreover, a guide member is constituted by the first guide 54 and the second guide 55.

A brush assembly 24B, as shown in FIGS. 19A and 19B, is constructed such that first and second ends of a pigtail 26 are joined to a brush 21 and a brush terminal 25, a brush spring 27 formed into a coil shape being disposed under compression between the brush 21 and the brush terminal 25 so as to envelop the pigtail 26, the first guide 54 being disposed inside the brush spring 27 at an end near the brush terminal 25, and the second guide 55 being disposed inside the brush spring 27 at an end near the brush 21. The first guide 54 and the second guide 55 are elastically supported by the first-guide flange portion 54*b* being held between the brush spring 27 and the brush terminal 25 and the second-guide flange portion 55*b* being held between the brush spring 27 and brush 21.

Moreover, Embodiment 4 is constructed in a similar manner to Embodiment 3 above except for the fact that the first and second guides 54 and 55 are used instead of the first and second guides 52 and 53.

As shown in FIG. 19A, before the brush assembly 24B is mounted in the brush holder 22, the pigtail 26 is disposed under tension between the brush 21 and the brush terminal 25 by the force of the brush spring 27, and the first and second guides 54 and 55 are disposed near the brush terminal 25 and the brush 21 inside the brush spring 27 such that end portions at opposite ends from the flange portions face each other. Moreover, the first and second guides 54 and 55 are disposed so as to be offset from each other by a predetermined pitch in a circumferential direction, such that the first-guide and second-guide slits 54*d* and 55*d* and the second-guide and first-guide tongue pieces 55*e* and 54*e* face each other.

When the brush assembly 24B is being mounted to the brush holder 22, the brush 21 is inserted into the brush insertion aperture 22*a* of the brush holder 22, and the brush terminal 25 is pressed. Thus, the brush spring 27 is guided by the cylindrical portions 54*a* and 55*a* of the first guide 54 and the second guide 55 while being compressed. At the same time, the first guide 54 approaches the brush 21 with this compression of the brush spring 27, the first-guide tongue pieces 54*e* entering the second-guide slits 55*d*, and the second-guide tongue pieces 55*e* entering the first-guide slits 54*d*. The pigtail 26, as shown in FIG. 19B, flexes with the compression of the brush spring 27, the flexed portions thereof being housed inside the penetrating apertures 54*c* and 55*c* of the first and second guides 54 and 55.

Consequently, similar effects to those in Embodiment 3 above can also be achieved in Embodiment 4.

Because the first guide 54 and the second guide 55 are formed into an identical shape, the internal volume of the penetrating apertures 54*c* and 55*c* of the first and second guides 54 and 55 can be increased, facilitating housing of the flexed portions of the pigtail 26.

Embodiment 5

Figure 21A:
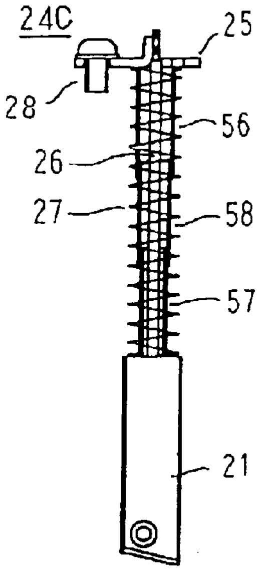
FIG. 21A is a diagram explaining a construction of a brush assembly in an automotive alternator according to Embodiment 5 of the present invention.
Figure 21B:
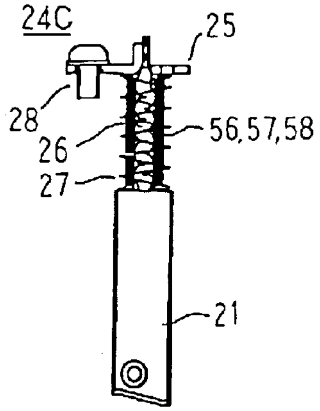
FIG. 21B is a diagram explaining the construction of the brush assembly in the automotive alternator according to Embodiment 5 of the present invention.
Figure 22:
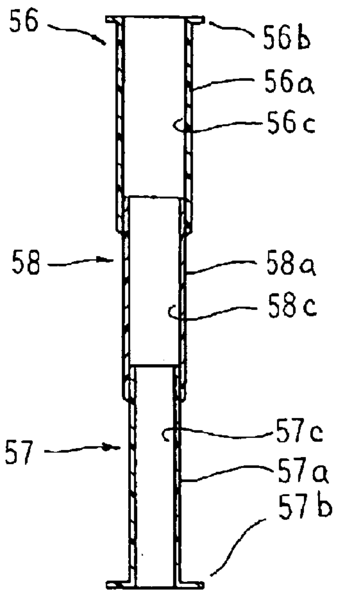
FIG. 22 is a cross section showing a guide used in the brush assembly in the automotive alternator according to Embodiment 5 of the present invention.

FIGS. 21A and 21B are diagrams explaining a construction of a brush assembly in an automotive alternator according to Embodiment 5 of the present invention, FIG. 21A showing a state before the brush assembly is mounted and FIG. 21B showing a mounted state of the brush assembly. FIG. 22 is a cross section showing a guide used in the brush assembly in the automotive alternator according to Embodiment 5 of the present invention.

In FIG. 22, a first guide 56 is prepared using a nylon (trademark of E. I. du Pont de Nemours and Company), and is constituted by: a first-guide cylindrical portion 56*a* having a shape tapering down toward a second end; and an annular first-guide flange portion 56*b* disposed so as to extend from an outer periphery of a first end of the first-guide cylindrical portion 56*a*. This first-guide cylindrical portion 56*a* is formed with a uniform thickness, a first-guide penetrating aperture 56*c* being constructed at a position of a central axis of the first-guide cylindrical portion 56*a* such that an inside diameter thereof gradually reduces toward the second end.

A second guide 57 is prepared using a nylon (trademark of E. I. du Pont de Nemours and Company), and is constituted by: a second-guide cylindrical portion 57*a* having a shape tapering down toward a second end; and an annular second-guide flange portion 57*b* disposed so as to extend from an outer periphery of the second end of the second-guide cylindrical portion 57*a*. This second-guide cylindrical portion 57*a* is formed with a uniform thickness, a second-guide penetrating aperture 57*c* being constructed at a position of a central axis of the second-guide cylindrical portion 57*a* such that an inside diameter thereof gradually reduces toward the second end.

An intermediate guide 58 is prepared using a nylon (trademark of E. I. du Pont de Nemours and Company), and is constructed with an intermediate-guide cylindrical portion 58*a* having a shape tapering down toward a second end. This intermediate-guide cylindrical portion 58*a* is formed with a uniform thickness, an intermediate-guide penetrating aperture 58*c* being constructed at a position of a central axis of the intermediate-guide cylindrical portion 58*a* such that an inside diameter thereof gradually reduces toward the second end.

Here, the inside diameter of the second end of the first-guide penetrating aperture 56*c* is greater than an outside diameter, of the first end of the intermediate-guide cylindrical portion 58*a*, and the inside diameter of the second end of the intermediate-guide penetrating aperture 58*c* is greater than an outside diameter of the first end of the second-guide cylindrical portion 57*a*. The first guide 56, the intermediate guide 58, and the second guide 57 are assembled such that the intermediate guide 58 is housed inside the first guide 56, and the second guide 57 is housed inside the intermediate guide 58. Thus, the intermediate guide 58 is installed in the first guide 56 telescopically, and the second guide 57 is installed in the intermediate guide 58 telescopically, making the entire construction expandable and compressible. Moreover, a guide member is constituted by the first guide 56, the intermediate guide 58, and the second guide 57.

A brush assembly 24C, as shown in FIGS. 21A and 21B, is constructed such that first and second ends of a pigtail 26 are joined to a brush 21 and a brush terminal 25, a brush spring 27 formed into a coil shape being disposed under compression between the brush 21 and the brush terminal 25 so as to envelop the pigtail 26, the first guide 56 being disposed inside the brush spring 27 at an end near the brush terminal 25, the second guide 57 being disposed inside the brush spring 27 at an end near the brush 21, and the intermediate guide 58 being disposed such that the first end thereof is housed inside the penetrating aperture 56*c* of the first guide 56 and the second end envelops the first end of the cylindrical portion 57*a* of the second guide 57. The first guide 56 and the second guide 57 are elastically supported by the first-guide flange portion 56*b* being held between the brush spring 27 and the brush terminal 25 and the second-guide flange portion 57*b* being held between the brush spring 27 and brush 21.

Moreover, Embodiment 5 is constructed in a similar manner to Embodiment 3 above except for the fact that the first, second, and intermediate guides 56, 57, and 58 are used instead of the first and second guides 52 and 53.

As shown in FIG. 21A, before a brush assembly 24C is mounted in the brush holder 22, the pigtail 26 is disposed under tension between the brush 21 and the brush terminal 25 by the force of the brush spring 27, the first and second guides 56 and 57 are disposed near the brush terminal 25 and the brush 21 inside the brush spring 27 such that end portions at opposite ends from the flange portions face each other, the intermediate guide 58 is disposed so as to link the first and second guides 56 and 57.

When the brush assembly 24C is being mounted to the brush holder 22, the brush 21 is inserted into the brush insertion aperture 22*a* of the brush holder 22, and the brush terminal 25 is pressed. Thus, the brush spring 27 is guided by the cylindrical portions 56*a*, 58*a*, and 57*a* of the first guide 56, the intermediate guide 58, and the second guide 57 while being compressed. The first guide 56 approaches the brush 21 with this compression of the brush spring 27, while the intermediate guide 58 is progressively housed inside the first-guide penetrating aperture 56*c*, and the second guide 57 is progressively housed inside the penetrating aperture 58*c* of the intermediate guide 58. The pigtail 26, as shown in FIG. 21B, flexes with the compression of the brush spring 27, the flexed portions thereof being housed inside the penetrating apertures 56*c*, 58*c*, and 57*c* of the first, intermediate, and second guides 56, 58, and 57.

Consequently, similar effects to those in Embodiment 3 above can also be achieved in Embodiment 5.

Furthermore, because the first, intermediate, and second guides 56, 58, and 57 are disposed so as to envelop the entire length of the pigtail 26 disposed under tension between the brush 21 and the brush terminal 25, the flexed portion of the pigtail 26 is reliably housed inside the cylindrical portions 56*c*, 58*c*, and 57*c*, enabling pinching of the pigtail 26 in the brush spring 27 to be reliably prevented.

Moreover, in Embodiment 5 above, the cylindrical portions 56*a*, 58*a*, and 57*a* of the first, intermediate, and second guides 56, 58, and 57 are each formed so as to have a shape tapering down toward the second end, but the cylindrical portions 56*a*, 58*a*, and 57*a* may also be formed into cylindrical shapes each having a uniform diameter. In that case, the diameters of the cylindrical portions 56*a*, 58*a*, and 57*a* should be reduced in order of the first-guide, intermediate-guide, and second-guide cylindrical portions 56*a*, 58*a*, and 57*a*, an engaging protrusion should be disposed so as to project from an inner wall surface at the second end of the first-guide cylindrical portion 56*a*, an engaged protrusion should be disposed so as to project from an outer wall surface at the first end of the intermediate-guide cylindrical portion 58*a*, an engaging protrusion should be disposed so as to project from an inner wall surface at the second end of the intermediate-guide cylindrical portion 58*a*, and an engaged protrusion should be disposed so as to project from an outer wall surface at the first end of the second-guide cylindrical portion 57*a*. Thus, the intermediate-guide cylindrical portion 58*a* is prevented from coming out of the first-guide cylindrical portion 56*a*, and the second-guide cylindrical portion 57*a* is prevented from coming out of the intermediate-guide cylindrical portion 58*a* during expansion by engagement between the engaging protrusions and the engaged protrusions, ensuring the expansion and compression of a guide member constituted by the first-guide, intermediate-guide, and second-guide cylindrical portions 56*a*, 58*a*, and 57*a* linked so as to be arranged in descending order of diameter.

Embodiment 6

FIGS. 23A and 23B are diagrams explaining a method for mounting a brush assembly in an automotive alternator according to Embodiment 6 of the present invention, FIG. 23A showing a state before the brush assembly is mounted and FIG. 23B showing a mounted state of the brush assembly. FIG. 24 is a cross section showing a guide used in the brush assembly in the automotive alternator according to Embodiment 6 of the present invention.

In FIG. 24, a guide 59 functioning as a guide member is prepared using a nylon (trademark of E. I. du Pont de Nemours and Company), and is constituted by: a cylindrical portion 59*a*; and an annular flange portion 59*b* disposed so as to extend from an outer periphery of a first end of the cylindrical portion 59*a*. This cylindrical portion 59*a* is formed with a uniform thickness, and a penetrating aperture 59*c* is constructed at a position of a central axis of the cylindrical portion 59*a* so as to have a uniform inside diameter.

A brush assembly 24D is constructed such that first and second ends of a pigtail 26 are joined to a brush 21 and a brush terminal 25, a brush spring 27 formed into a coil shape being disposed under compression between the brush 21 and the brush terminal 25 so as to envelop the pigtail 26, and the guide 51 being disposed inside the brush spring 27 at an end near the brush terminal 25. The flange portion 59*b* is mounted so as to be held between the brush spring 27 and the brush terminal 25, the guide 51 being elastically supported.

Here, the guide 59 is formed so as to have a length that is shorter than the distance between the brush 21 and the brush terminal 25 in a state in which a brush assembly 24D holding an unused brush 21 is installed in the brush holder 22.

In Embodiment 6, as shown in FIG. 23A, before inserting the brush assembly 24D into the brush insertion aperture 22*a*, the brush 21 and the brush terminal 25 are fastened by a tie 60 with the brush spring 27 in a compressed state such that the brush 21 is placed in contact with the second end of the guide 59. Thus, the brush spring 27 is maintained in a compressed state equal to the length of the guide 59, the flexed portion of the pigtail 26 being housed inside the penetrating aperture 59*c* of the guide 59.

The brush 21 of the brush assembly 24D fastened by the tie 60 is inserted into the brush insertion aperture 22*a*. At this time, because the length from the leading end of the brush 21 to the brush terminal 25 is shorter than the aperture depth of the brush insertion aperture 22*a*, the brush terminal 25 is mounted to the holder terminal 23 without the leading end of the brush 21 contacting the slip ring 9. Then, the cut aperture 25*a* of the brush terminal 25 is aligned with the holder-terminal threaded aperture 23*a* of the holder terminal 23, and the terminal screw 28 is fastened to the holder-terminal threaded aperture 23*a*. Thereafter, the compressed state of the brush spring 27 is released by releasing the tie 60, and the tie 60 is pulled out. Thus, the brush spring 27 returns to its original state as shown in FIG. 23B, the brush 21 being placed in contact with the slip ring 9 by the restoring force of the brush spring 27, thereby completing installation of the brush assembly 24D in the brush holder 22.

According to Embodiment 6, before inserting the brush assembly 24D into the brush insertion aperture 22*a*, the brush spring 27 is compressed by pressing the brush assembly 24D from first and second longitudinal ends thereof such that the brush 21 and the brush terminal 25 approach each other, and the brush 21 and the brush terminal 25 are fastened by a tie 60 while maintaining the compressed state of the brush spring 27. Thus, the brush spring 27 can be compressed in a large workspace, and the brush spring 27 is guided by the cylindrical portion 59*a* of the guide 59 and compressed smoothly, enabling flopping over of the brush spring 27 and pinching of the pigtail 26 in the brush spring 27 to be prevented.

The brush 21 and the brush terminal 25 are fastened by the tie 60 with the brush spring 27 in a compressed state before inserting the brush assembly 24D into the brush insertion aperture 22*a*. Thus, flopping over of the brush spring 27 and pinching of the pigtail 26 in the brush spring 27 resulting from the process of compressing the brush spring 27 with the brush 21 of the brush assembly in which the pigtail 26 is disposed under tension inserted into the brush insertion aperture 22*a* are eliminated. Because the brush 21, the brush terminal 25, and the brush spring 27 are integrated by fastening with the tie 60, insertion of the brush 21 into the brush insertion aperture 22*a* and fastening with the terminal screw 28 can easily be achieved. Thus, the mounting workability of the brush assembly 24D is improved significantly.

Moreover, in Embodiment 6, a method for mounting the brush assembly 24D has been explained, but it goes without saying that this mounting method may be also be applied to the brush assemblies according to Embodiments 1 to 5 above.

Embodiment 7

Figure 25A:
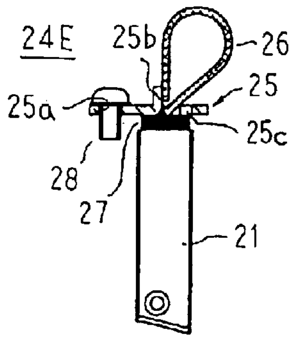
FIG. 25A is a diagram explaining a method for mounting a brush assembly in an automotive alternator according to Embodiment 7 of the present invention.
Figure 25B:
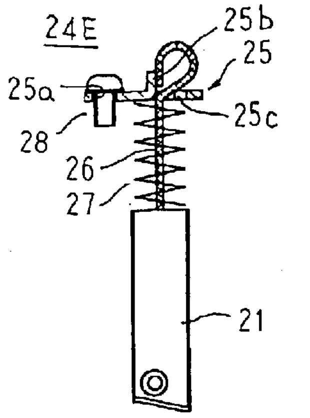
FIG. 25B is a diagram explaining the method for mounting the brush assembly in the automotive alternator according to Embodiment 7 of the present invention.

FIGS. 25A and 25B are diagrams explaining a method for mounting a brush assembly in an automotive alternator according to Embodiment 7 of the present invention, FIG. 25A showing a state before the brush assembly is mounted and FIG. 25B showing a mounted state of the brush assembly.

In FIGS. 25A and 25B, a brush assembly 24E is constructed such that the first end of the pigtail 26 is led out through the cut aperture 25*c*, then returned so as to be redirected toward the brush 21 and joined to the cut-and-raised segment 25*b*, and the second end thereof is joined to the brush 21, the brush spring 27 formed into a coil shape being disposed under compression between the brush 21 and the brush terminal 25 so as to envelop the pigtail 26.

In Embodiment 7, as shown in FIG. 25A, before inserting the brush assembly 24E into the brush insertion aperture 22*a*, the brush spring 27 is compressed by pulling a first end portion of the pigtail 26 out through the cut aperture 25*c* of the brush terminal 25. At this time, the brush spring 27 is compressed to a length such that the brush terminal 25 will be mounted to the holder terminal 23 without the leading end of the brush 21 contacting the slip ring 9 when the brush 21 of the brush assembly 24E is inserted into the brush insertion aperture 22*a*.

Then, the brush 21 of the brush assembly 24E is inserted into the brush insertion aperture 22*a* with the brush spring 27 in a compressed state, and the brush terminal 25 is mounted to the holder terminal 23. Then, the cut aperture 25*a* of the brush terminal 25 is aligned with the holder-terminal threaded aperture 23*a* of the holder terminal 23, and the terminal screw 28 is fastened to the holder-terminal threaded aperture 23*a*. Thereafter, the tension on the pigtail 26 is released. Thus, the brush spring 27 returns to its original state as shown in FIG. 25B, the pigtail 26 being pulled inside the brush spring 27 through the cut aperture 25*c* and the brush 21 being placed in contact with the slip ring 9 by the restoring force of the brush spring 27, thereby completing installation of the brush assembly 24E in the brush holder 22.

According to Embodiment 7, because the brush spring 27 is compressed by pulling the first end portion of the pigtail 26 out through the cut aperture 25*c* of the brush terminal 25 before inserting the brush assembly 24E into the brush insertion aperture 22*a*, pinching of the pigtail 26 in the brush spring 27 is reliably prevented.

Because the brush 21 of the brush assembly 24E is inserted into the brush insertion aperture 22*a* with the brush spring 27 in a compressed state, flopping over of the brush spring 27 and pinching of the pigtail 26 in the brush spring 27 resulting from the process of compressing the brush spring 27 with the brush 21 of the brush assembly in which the pigtail 26 is disposed under tension inserted into the brush insertion aperture 22*a* are eliminated, and insertion of the brush 21 into the brush insertion aperture 22*a* and fastening with the terminal screw 28 can easily be achieved, whereby the mounting workability of the brush assembly 24E is improved significantly.

Because the first end of the pigtail 26 is led out through the cut aperture 25*c*, then returned so as to be redirected toward the brush 21 and joined to the cut-and-raised segment 25*b*, when the brush assembly 24E is mounted to the brush holder 22, the second end of the pigtail 26 projects outside the brush terminal 25, as shown in FIG. 25B, due to the rigidity of the pigtail 26. Thus, because the flexed portion of the pigtail 26 projects from the brush terminal 25, pinching of the pigtail 26 in the brush spring 27 is prevented.

Because the first end of the pigtail 26 is directed toward the brush 21 and joined to the cut-and-raised segment 25*b*, the pigtail 26 can be pulled out through the cut aperture 25*c* of the brush terminal 25 easily.

Moreover, in Embodiment 7, a method for mounting the brush assembly 24E has been explained, but it goes without saying that this mounting method may be also be applied to the brush assemblies according to Embodiments 1 to 6 above.

Embodiment 8

Figure 26A:
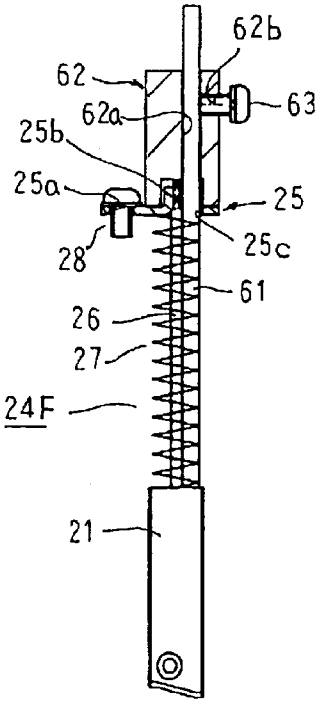
FIG. 26A is a diagram explaining a method for mounting a brush assembly in an automotive alternator according to Embodiment 8 of the present invention.
Figure 26B:
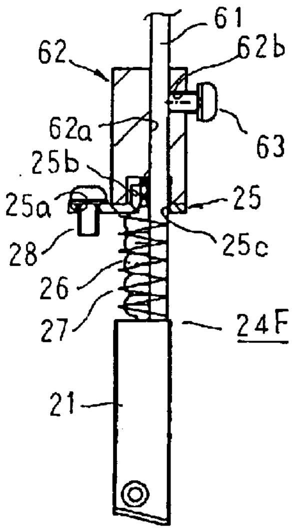
FIG. 26B is a diagram explaining the method for mounting the brush assembly in the automotive alternator according to Embodiment 8 of the present invention.
Figure 27:
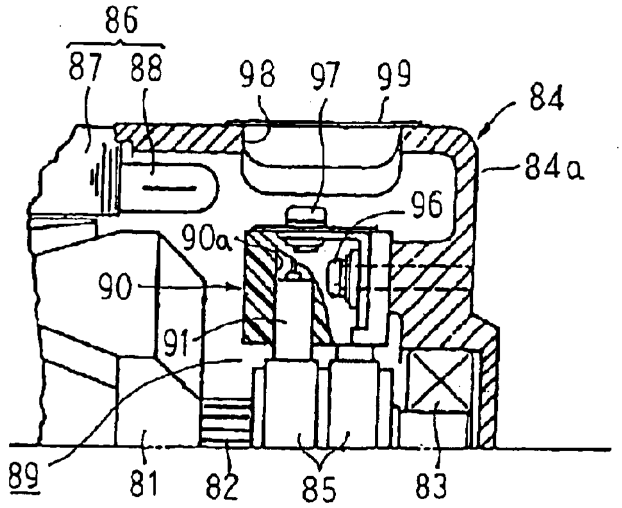
FIG. 27 PRIOR ART
FIG. 27 is a partial longitudinal section showing a vicinity of a brush holding apparatus of a conventional automotive alternator.
Figure 28:
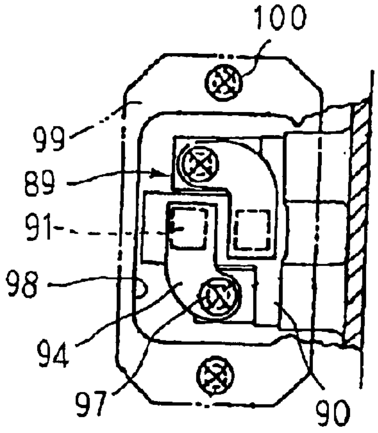
FIG. 28 PRIOR ART
FIG. 28 is a plan showing the vicinity of the brush holding apparatus of the conventional automotive alternator.
Figure 29:
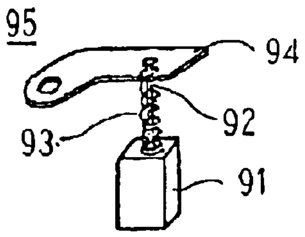
FIG. 29 PRIOR ART
FIG. 29 is a perspective showing a brush assembly used in the conventional brush holding apparatus.

FIGS. 26A and 26B are diagrams explaining a method for mounting a brush assembly in an automotive alternator according to Embodiment 8 of the present invention, FIG. 26A showing a state before pressing a brush spring in the brush assembly and FIG. 26B showing a mounted state of the brush assembly.

In FIGS. 26A and 26B, a pipe 61 functioning as a guide member has a diameter which can be inserted through the cut aperture 25*c* of the brush terminal 25 and guides the compression of the brush spring 27. A push-in jig 62 is a metal block, a jig penetrating aperture 62*a* through which the pipe 61 is inserted being disposed therethrough, and a jig threaded aperture 62*b* being formed so as to communicate between the jig penetrating aperture 62*a* and an external portion. A brush assembly 24F is constructed such that the first end of the pigtail 26 is directed away from the brush 21 and joined to the cut-and-raised segment 25*b*, and the second end thereof is joined to the brush 21, the brush spring 27 formed into a coil shape being disposed under compression between the brush 21 and the brush terminal 25 so as to envelop the pigtail 26.

In Embodiment 8, as shown in FIG. 26A, the pipe 61 is inserted into the brush spring 27 through the cut aperture 25*c* with the brush 21 of the brush assembly 24F inserted into the brush insertion aperture 22*a*. Then, the push-in jig 62 is mounted by passing a projecting portion of the pipe 61 projecting out of the brush terminal 25 through the jig penetrating aperture 62*a*. Next, the brush terminal 25 is placed in contact with the holder terminal 23 by placing the push-in jig 62 against the brush terminal 25 and pressing toward the brush 21 using the pipe 61 as a guide. Thus, the brush spring 27 is compressed using the pipe 61 as a guide.

Then, as shown in FIG. 26B, the pipe 61 is fixed by fastening a fastening screw 63 engaged in the threaded aperture 62*b* of the push-in jig 62. Next, the terminal screw 28 is passed through the cut aperture 25*b* and fastened to the holder-terminal threaded aperture 23*a*. Thereafter, the push-in jig 62 is pulled out together with the pipe 61, thereby completing installation of the brush assembly 24F in the brush holder 22.

According to Embodiment 8, because the pipe 61 is inserted into the brush spring 27 through the cut aperture 25*c* of the brush terminal 25 before pressing the brush terminal 25 of the brush assembly 24F toward the brush 21, the brush spring 27 is guided by the pipe 61 in the process of pressing the brush terminal 25 toward the brush 21 and compressed smoothly, reliably preventing the brush spring 27 from flopping over.

Moreover, in each of the above embodiments, each of the guides is prepared using a nylon, but it is only necessary for the guide to serve the functions of guiding the compression of the brush spring 27 and enabling the flexed portion of the pigtail 26 to be housed, and another resin may also be used, or a metal material may also be used.

In each of the above embodiments, an automotive alternator has been explained, but the present invention also exhibits similar effects if applied to a dynamoelectric machine such as an alternating-current electric motor, an alternating-current electric motor-generator, etc.

What is claimed is:

1. A dynamoelectric machine comprising:

a case;

a shaft, first and second ends of said shaft being rotatably supported in said case;

a rotor fixed to said shaft and rotatably disposed inside said case;

a slip ring fixed to said shaft;

a stator fixed to said case so as to surround said rotor;

a brush holder through which a brush insertion aperture is disposed, a holder terminal being disposed on an opening edge portion of said brush insertion aperture, and a cover being mounted to a head portion of said brush holder, said brush holder being disposed inside said case such that an aperture direction of said brush insertion aperture is perpendicular to an axial direction of said shaft;

a brush assembly mounted to said brush holder;

an opening portion formed in a portion of said case facing said cover; and a cap for covering said opening portion, wherein said brush assembly is constructed such that a brush and a brush terminal are linked by means of a pigtail, a brush spring is disposed under compression between said brush and said brush terminal, and a guide member for guiding expansion and compression of said brush spring is disposed inside said brush spring, and wherein said brush is housed inside said brush insertion aperture, said brush terminal is fixed to said holder terminal, and said brush is placed in contact with said slip ring by a force from said brush spring.

2. The dynamoelectric machine according to claim 1, wherein said guide member is provided with a cylindrical first guide disposed such that said pigtail passes through an interior portion and a first end thereof contacts said brush terminal.

3. The dynamoelectric machine according to claim 2, wherein said first guide is formed such that an inside diameter increases gradually from the first end toward a second end.

4. The dynamoelectric machine according to claim 2, wherein said first guide is constructed with a C-shaped cross section in which a slit is formed so as to extend from the first end to a second end.

5. The dynamoelectric machine according to claim 2, wherein said guide member is provided with a second guide disposed such that said pigtail passes through an interior portion and a first end thereof contacts said brush.

6. The dynamoelectric machine according to claim 5, wherein an inside diameter of said first guide is formed so as to be larger than an outside diameter of said second guide.

7. The dynamoelectric machine according to claim 5, wherein said first and second guides are each formed with a plurality of slits in a circumferential direction, each slit being formed so as to extend from a first end portion to a second end, said first and second guides being disposed such that with said brush spring in a compressed state tongue pieces formed between said slits of said second guide are inserted into said slits of said first guide, and tongue pieces formed between said slits of said first guide are inserted into said slits of said second guide.

8. The dynamoelectric machine according to claim 1, wherein said guide member is constructed such that a plurality of guides each having a different diameter are arranged and linked expandably and compressibly in descending order of diameter, said plurality of guides being disposed between said brush terminal and said brush such that a first guide having a largest diameter contacts either of said brush terminal and said brush, and a second guide having a smallest diameter contacts the other of said brush terminal and said brush.

9. The dynamoelectric machine according to claim 1, wherein said brush terminal is fastened to said holder terminal by a magnetized screw.

* * * * *